US008807455B2

(12) United States Patent
Havlovitz et al.

(10) Patent No.: US 8,807,455 B2
(45) Date of Patent: Aug. 19, 2014

(54) SPRAYER

(75) Inventors: Paul M. Havlovitz, Plain City, OH (US);
Sean D. Montag, Westerville, OH (US);
Paul E. Hsu, Lewis Center, OH (US);
Jay F. Perkins, Pickerington, OH (US);
Michael T. Kopczewski, Grove City, OH (US)

(73) Assignee: OMS Investments, Inc., Los Angeles, CA (US)

( * ) Notice: Subject to any disclaimer, the term of this patent is extended or adjusted under 35 U.S.C. 154(b) by 955 days.

(21) Appl. No.: 12/646,079

(22) Filed: Dec. 23, 2009

(65) Prior Publication Data
US 2010/0163646 A1 Jul. 1, 2010

Related U.S. Application Data

(60) Provisional application No. 61/140,471, filed on Dec. 23, 2008.

(51) Int. Cl.
*A01G 25/14* (2006.01)
*B05B 11/00* (2006.01)

(52) U.S. Cl.
CPC ............................ *B05B 11/0054* (2013.01)
USPC ............ 239/375; 239/351; 239/526; 239/333

(58) Field of Classification Search
CPC .. B05B 9/0416; B05B 9/0426; B05B 9/0861; B05B 9/0866; B05B 11/0054
USPC .......... 239/351, 375, 379, 526, 332, 333, 525
See application file for complete search history.

(56) References Cited

U.S. PATENT DOCUMENTS

| | | | |
|---|---|---|---|
| 2,416,719 A | 3/1947 | Stockdale | |
| 2,460,545 A | 2/1949 | Spreng | |
| 2,647,798 A | 8/1953 | Ballard | |
| 4,878,619 A | 11/1989 | Norman | |
| 4,982,896 A | 1/1991 | Crow | |
| 5,069,390 A * | 12/1991 | Stern et al. | 239/320 |
| 5,143,294 A | 9/1992 | Lintvedt | |
| 5,263,646 A | 11/1993 | McCauley et al. | |
| 5,678,768 A | 10/1997 | Gager et al. | |
| 6,390,335 B1 | 5/2002 | Lawson et al. | |
| 6,402,053 B1 | 6/2002 | Chih | |
| 6,422,485 B1 | 7/2002 | Hsu | |
| 6,595,437 B1 | 7/2003 | Lawson et al. | |
| 6,612,506 B1 | 9/2003 | Huang | |
| 6,726,123 B2 | 4/2004 | Wang | |
| 6,896,203 B1 | 5/2005 | Restive | |
| 6,976,640 B2 | 12/2005 | Chen | |
| 6,976,644 B2 | 12/2005 | Troudt | |
| 6,988,675 B2 | 1/2006 | Hubmann et al. | |
| 7,021,571 B1 * | 4/2006 | Lawson et al. | 239/601 |
| 7,083,125 B2 | 8/2006 | Westphal et al. | |

(Continued)

OTHER PUBLICATIONS

International Search Report for International Patent Application No. PCT/US2009/069396 mailed Mar. 1, 2010.

*Primary Examiner* — Dinh Q Nguyen
(74) *Attorney, Agent, or Firm* — Hunton & Williams LLP

(57) ABSTRACT

A spray device for dispensing chemicals is disclosed. The spray device comprises a cartridge defining an interior compartment for containing a liquid product, an applicator having a support body, an extendable wand attached to the support body, a handle at a rear end of the support body, and a pump.

11 Claims, 12 Drawing Sheets

(56) References Cited

U.S. PATENT DOCUMENTS

| | | |
|---|---|---|
| 7,086,610 B2 | 8/2006 | Hubmann et al. |
| 7,156,324 B2 | 1/2007 | Birrenkott et al. |
| 7,168,629 B2 | 1/2007 | Timmes et al. |
| 7,182,280 B2 | 2/2007 | Ye et al. |
| 7,520,447 B2 * | 4/2009 | Engelen et al. ............... 239/302 |
| 2004/0007633 A1 | 1/2004 | Simmons |
| 2005/0103893 A1 * | 5/2005 | Birrenkott et al. ............ 239/345 |
| 2005/0145270 A1 | 7/2005 | Ray |
| 2006/0255183 A1 | 11/2006 | Burdsall et al. |
| 2007/0125878 A1 * | 6/2007 | Hahn et al. .................... 239/332 |
| 2007/0170285 A1 | 7/2007 | Schouten |

\* cited by examiner

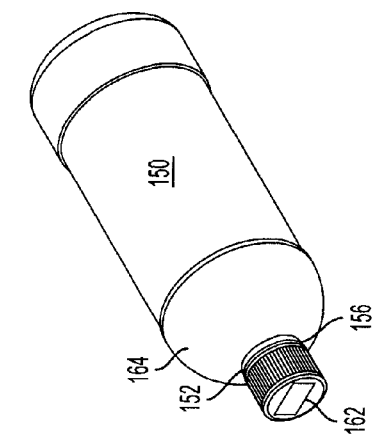
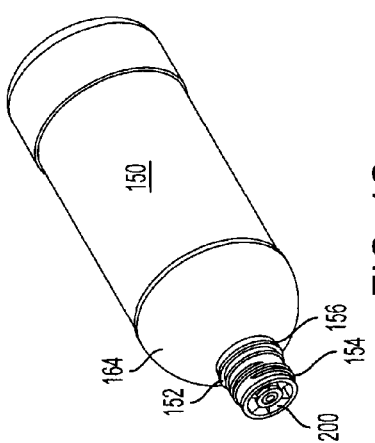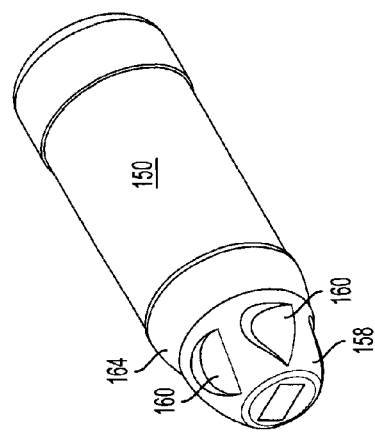

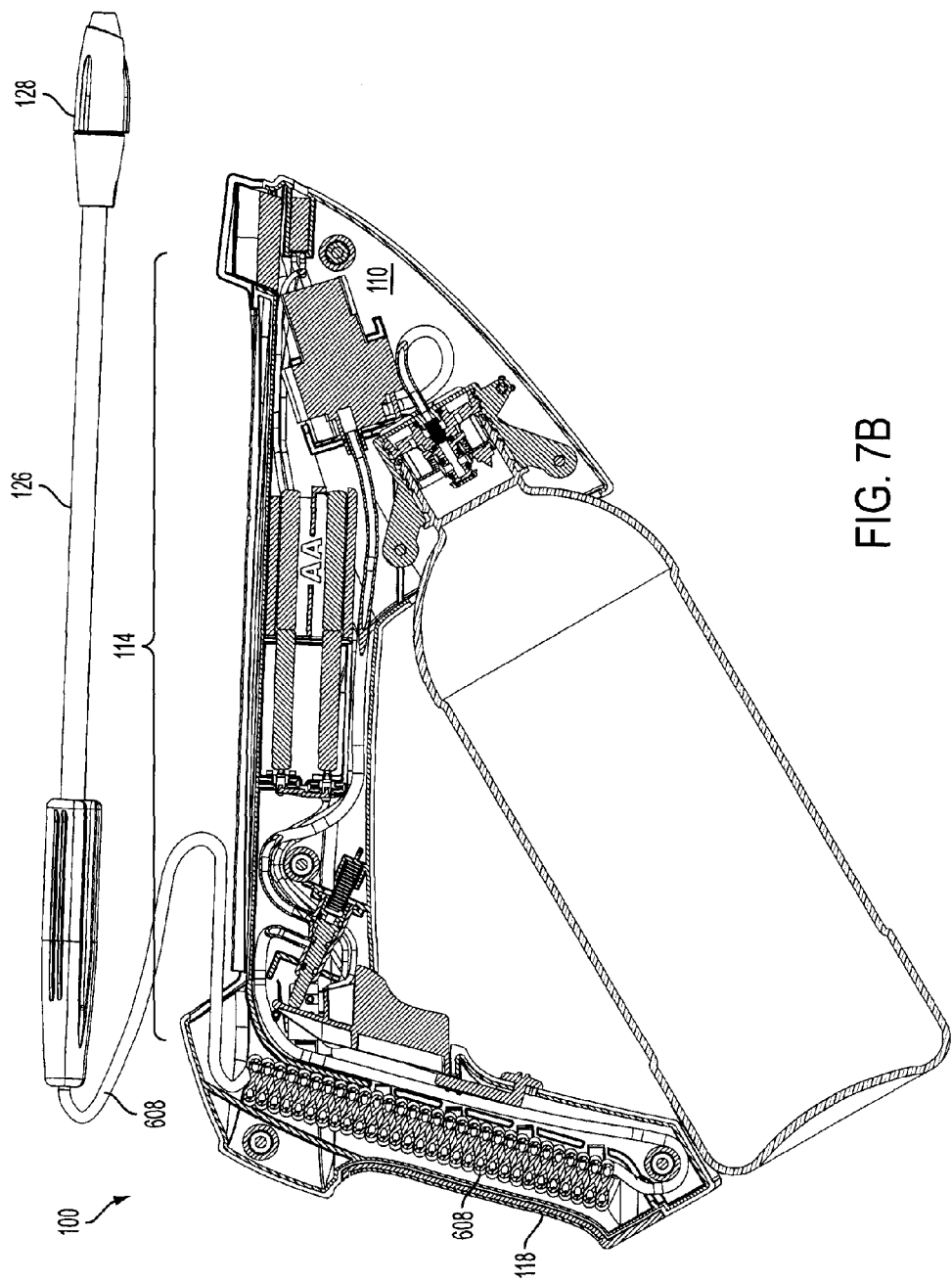

SPRAYER

1. CROSS-REFERENCE TO RELATED APPLICATIONS

This application claims the benefit of U.S. Provisional Application No. 61/140,471, filed Dec. 23, 2008.

2. FIELD OF THE ART

The present embodiments relate generally to a sprayer, and more particularly to a sprayer with an extendable wand that can dispense ready-to-use liquids, such as fertilizers, herbicides, pesticides, fungicides, and insecticides.

3. DESCRIPTION OF RELATED ART

There are many known spray devices for dispensing chemicals to maintain gardens and yards, trees and shrubs, or plants. Most spray devices use ready-to-use (RTU) liquids, like fertilizers, herbicides, insecticides, and fungicides, that can be dispensed directly from the spray device in a variety of spray patterns. Indeed, many handheld spray devices currently exist. The most common spray devices have an integrated, all-in-one design where a bottle is integrally formed with an applicator. These all-in-one spray devices, however, have limited functionality and usefulness for many reasons, one primary disadvantage being because they are intended for single use only. Devices that are manufactured for only a single use present many disadvantages. For example, there are significant manufacturing and production constraints because the devices must be produced at a low cost in order to realize a profit for each individual device sold. Another disadvantage is that single use devices adversely impact the environment because each device must be immediately discarded after each use.

Some other spray devices are currently available and include a cartridge, bottle, or reservoir that contains the RTU liquid to be discharged. This cartridge is operably coupled to an applicator of some kind in order to dispense the liquid. Existing sprayers use different types of fitment systems to operably couple the cartridge to the applicator, however. For example, U.S. Pat. No. 6,390,335 describes a needle fitment system to operably couple the cartridge to the applicator. Such a system discloses fitment where a first needle is designed to puncture the cartridge to establish a fluid connection and a second needle punctures the cartridge for venting purposes. Similarly, U.S. Pat. No. 5,842,682 describes a fitment system where a quick-disconnect valve, e.g. an umbrella valve, establishes the fluid connection between the cartridge and applicator. Other common spraying devices use a dip tube that extends from the applicator into the cartridge to provide a fluid passageway for the RTU liquid. Moreover, other typical spray devices use propellants. Using propellants has detrimental effects on the environment. These aerosol spray devices create an aerosol mist of liquid particles by use of a can or bottle that contains fluid under pressure. More common RTU-liquid spray devices eliminate the use of pressurized containers, thus avoiding potential and significant safety hazards, as pressurized containers may explode and cause injury. Examples of non-aerosol pump spray apparatus may be seen by reference to U.S. Pat. Nos. 5,938,116; 5,918, 782; 5,860,574; 5,816,447; 5,810,211 and 4,174,055.

Notwithstanding the number of spray devices that currently exist, most fail to provide a reliable, user-friendly device that is cost-effective to manufacture and easy to use, together with reduced safety hazards. The foregoing embodiments described provide a reusable spray applicator with value-added features that brings greater functionality and safety to users. The present spray devices combines numerous advantages into one multi-functional device, the advantages include (1) a cartridge that easily connects to the applicator in a secure fashion to substantially eliminate any chance that a user will be exposed to the liquid stored in the cartridge, (2) a manual or electrical pressure-charging mechanism that provides an increase in spray duration while reducing the effort required to charge the spray applicator, (3) an extendable and/or removable spray wand to provide users with improved application control and ease of use, and (4) a reduction in the amount of material entering the waste stream.

The description herein of certain advantages and disadvantages of known devices and methods, is not intended to limit the scope of the embodiments. Indeed, the exemplary embodiments may include some or all of devices and methods described above without suffering from the same disadvantages.

4. BRIEF DESCRIPTION OF THE DRAWINGS

Purposes and advantages of the exemplary embodiments will be apparent to those of ordinary skill in the art from the following detailed description together with the appended drawings, where like reference numerals are used to indicate like elements:

FIG. 4A is a perspective view of a cartridge for use with a sprayer, in accordance with an exemplary embodiment.

FIG. 4B is a perspective view of a cartridge for use with a sprayer, in accordance with an exemplary embodiment.

FIG. 4C is a perspective view of a cartridge for use with a sprayer, in accordance with an exemplary embodiment.

FIG. 7B is a cross-sectional view of a sprayer with a detached, extendable wand, in accordance with an exemplary embodiment.

5. DETAILED DESCRIPTION OF THE INVENTION

Figure 1:
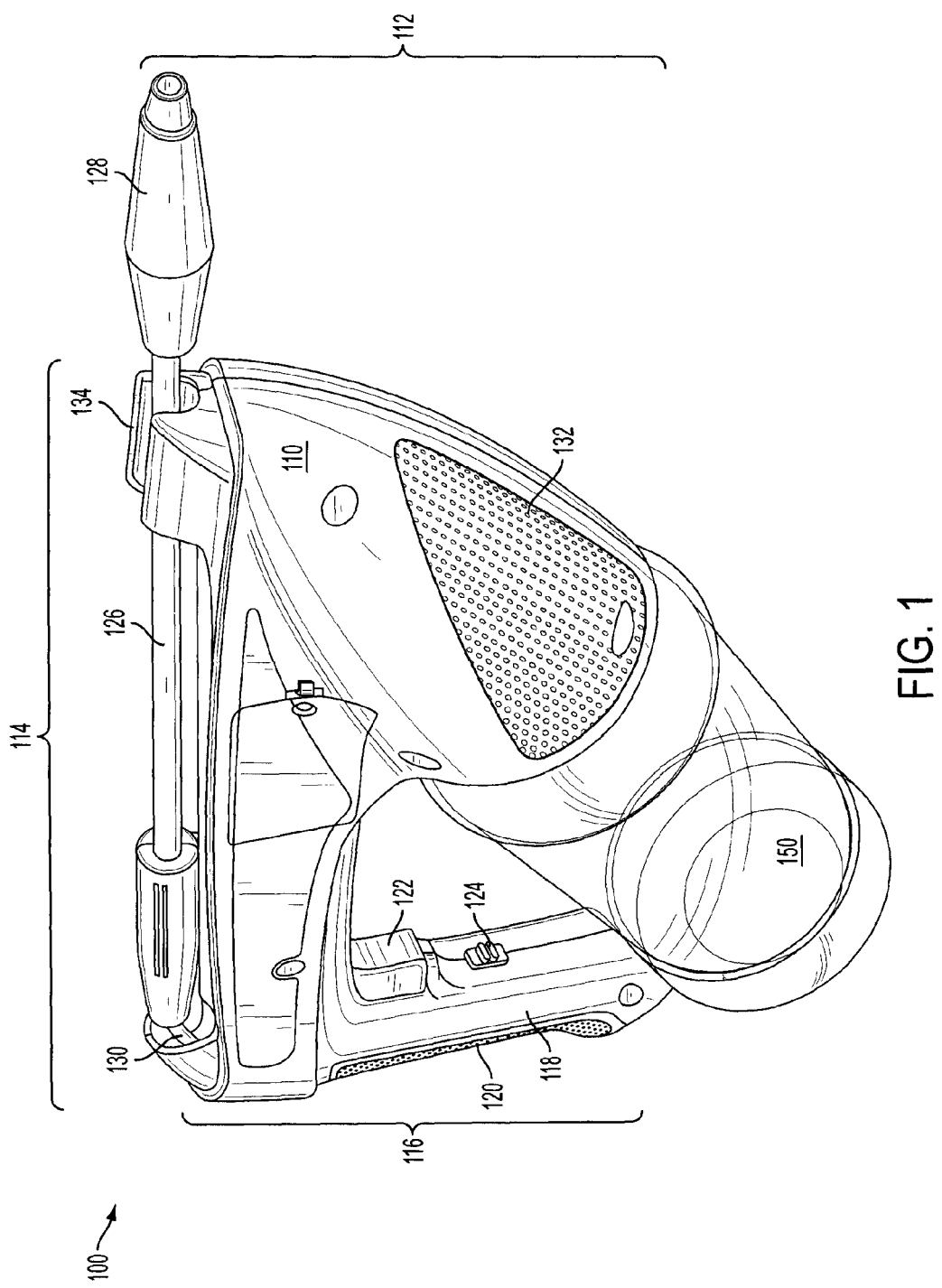
FIG. 1 is a perspective view of a sprayer, in accordance with an exemplary embodiment

The accompanying figures and following description depict and describe exemplary embodiments of a sprayer for discharging liquid. As used throughout this description, the term "sprayer" or other like terms are meant to encompass a structure adapted to discharge, dispense, project, spray, etc., liquid. In exemplary embodiments the liquid to be discharged may be a fertilizer, pesticide, insecticide, fungicide, etc. It should be appreciated, however, that the exemplary embodiments of the sprayer described throughout are not limited to any specific embodiment or detail that is disclosed. Moreover, one of ordinary skill in the art will appreciate the use of the exemplary embodiments for their intended purposes and benefits in a number of alternative embodiments as required on specific design or other needs.

With regard the exemplary embodiments of the sprayer described below, any part that fastens, mounts, attaches, or connects any component to form the sprayer shall not be limited to any particular type and is instead intended to encompass all known and conventional fasteners like screws, nut and bolt connectors, threaded connectors, snap rings, detent arrangements, claims, rivets, toggles, etc. Fastening may also be accomplished by other known fitments like other leak-tight seals or sealing devices. Components may also be connected by adhesives, glues, welding, ultrasoninc welding, and friction fitting or deformation. Of course, combinations of these fitment systems might be used.

With regard to electronic parts of the sprayer, any known or conventional, or commercially available electronic components, connectors, or devices may be used. This includes wiring, connectors, printed circuit boards, microchips, lights, LED's, pressure sensors, liquid level sensors, etc. Unless otherwise specifically disclosed, materials for making components of the present invention may be selected from appropriate materials, such as metal, alloys, natural or manmade fibers, vinyls, plastics, silicone, rubber, etc. Any and all appropriate manufacturing or production methods, such as casting, pressing, extruding, molding, machining, may be used to construct the exemplary embodiments described below.

Lastly, when describing exemplary embodiments of the sprayer, any reference to front and back or rear, top and bottom, right and left, upper and lower, etc., is intended for the convenience of describing such embodiments only. Such references do not limit the exemplary embodiments or its components to any specific positional or spacial orientation.

Exemplary embodiments of the sprayer will now be described more fully with reference to the accompanying drawings, in which some, but not all, embodiments are illustrated.

With reference to FIGS. 1-7B, exemplary embodiments of a sprayer in accordance with the present invention are shown. Each of the exemplary embodiments generally includes a trigger-operated sprayer designed to discharge liquid from a cartridge that is securely attached to an applicator. The exemplary embodiments generally show a sprayer having a gun-like shape with a fluid-containing cartridge attached thereto. Each embodiment includes a suitable trigger mechanism for actuating a standard pumping mechanism housed inside of the sprayer. Other embodiments, however, may include a manual pumping assembly, which will be described later, in lieu of an electronic pump. An embodiment that employs a manual pumping assembly may still employ a trigger mechanism as the means to dispense liquid from the applicator. Generally, each embodiment may also include an adjustable or nonadjustable nozzle assembly for discharging liquid that is attached spray arm. Each of these parts generally referred to here will be described in more detail below.

Figure 2:
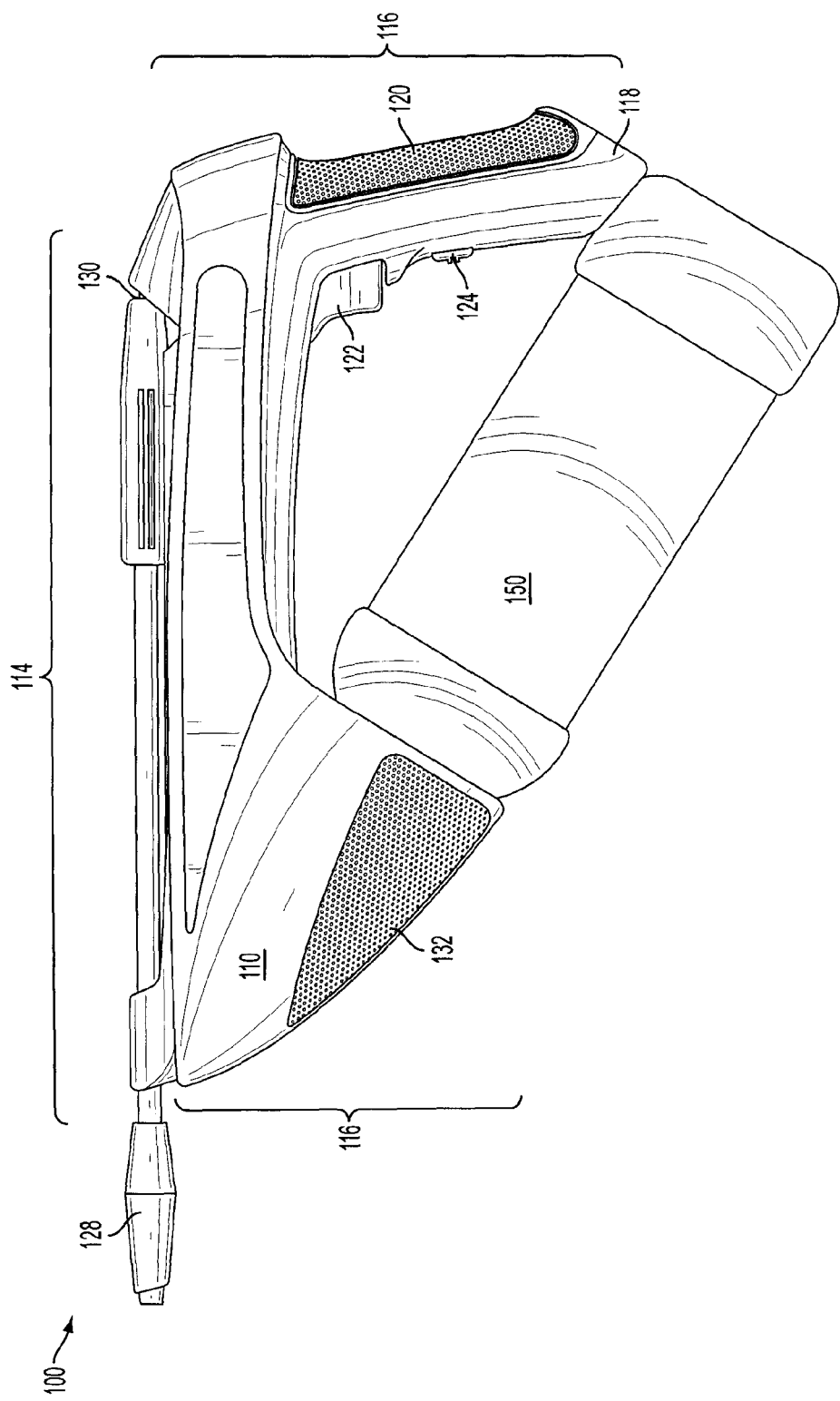
FIG. 2 is a side view of a sprayer, in accordance with an exemplary embodiment.

FIGS. 1 and 2 illustrate an exemplary embodiment of a sprayer 100. The sprayer 100 generally may have an applicator 110 and a cartridge 150. The applicator 110 may have a front portion 112, a barrel portion 114, and a rear portion 116. Generally, the sprayer 100 may be configured such that the cartridge 150 may be securely, but removably, attached to the front portion 112 of the applicator 100. The cartridge 150 may be removably connected to the front portion 112 in any appropriate manner, like through threaded connectors, snap rings, detent arrangements, etc. In one embodiment, the cartridge 150 may be securely screwed into an appropriate receiving port (not shown) located inside of the front portion 112 of the sprayer 100. When connected to the applicator 110, the centerline of the cartridge 150 may form a roughly 45° angle with respect to an axis that is parallel to the barrel portion 114 of the applicator 110. In such an embodiment, the cartridge 100 may extend from the front portion 112 to the rear portion 116 of the applicator. The rear portion 116 of the applicator 110 may include a handle 118 to allow a user to comfortably grasp and operate the sprayer 100. Once connected, part of the cartridge 100, at or near its bottom end, may be adjacent to, or even mate against, an inside portion of the handle 118. For example, the handle 118 may be configured to create an interface where a portion of the cartridge 150 mates against a portion of the handle 118. The handle 118, therefore, may provide additional support to securely hold the cartridge 100.

Moreover, the handle 118 and the cartridge's 150 bottom face may provide a substantially stable mounting base for the sprayer 100. In other words, when the cartridge 100 is connected to the front portion 112, the sprayer 100 may be placed in an upright position on a surface, thereby preventing it from being laid on its side. Such an ability to maintain the sprayer 100 in an upright position reduces the chance for any spillage or leakage.

Figure 3A:
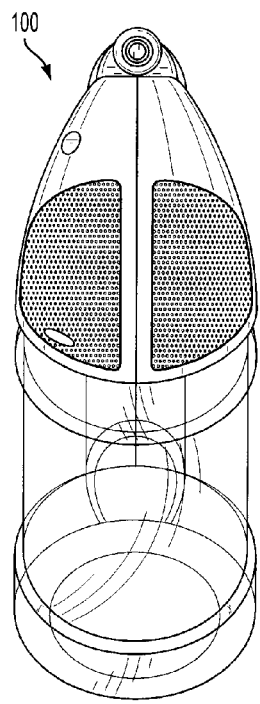
FIG. 3A is a front perspective view of a sprayer, in accordance with an exemplary embodiment.
Figure 3B:
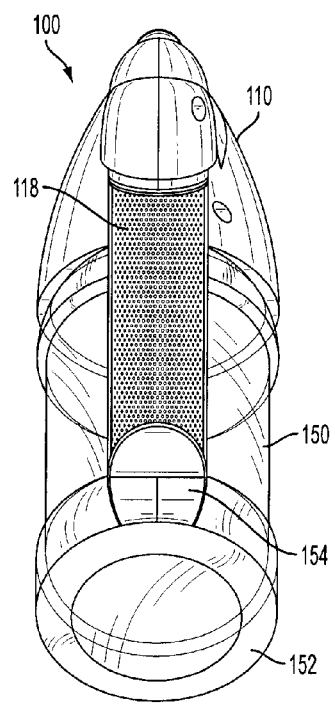
FIG. 3B is a back perspective view of a sprayer, in accordance with an exemplary embodiment.

FIGS. 3A and B illustrate an exemplary embodiment of the sprayer 100, where the sprayer 100 is in an upright position. FIG. 3A illustrates the sprayer 100 in an upright position from a front perspective view, and FIG. 3B illustrates the sprayer 100 in an upright position from a rear perspective view. Referring to the exemplary embodiment of FIG. 3B, the handle 118 may have a substantially flat bottom face 154, and the cartridge 150 may have a substantially flat bottom face 152. The handle's 118 substantially flat bottom face 154 and the cartridge's 150 substantially flat bottom face 152 may generally lie in the same plane so as to cooperate to provide a stable, flat surface to support the sprayer 100 in an upright position.

As mentioned above and referring back to FIGS. 1 and 2, the rear portion 116 of the applicator 110 may comprise a handle 118. On its outside face, the handle 118 may extend downwardly, in a substantially perpendicular direction, from the barrel portion 114 of the applicator 110. The handle 118 may have a slightly indented portion on its rear face to provide a user with easier grip, and that matches the natural orientation of a user's grip. In one embodiment, the handle 118 may also include one or more ergonomic gripping pads 120. The ergonomic pad 120 may be formed or molded along the outer periphery of the handle 118 in the indented part of the handle 118. The gripping pad 120 may be shaped to accommodate the natural orientation of a user's grip. In one embodiment, the gripping pad 120 may extend along the entire length of the handle 118 in a substantially elongated shape. The gripping pad 120 may have a varied length and width. The size and shape of the gripping pad 120 may also be changed to conform to whatever handle 118 design may be used.

The handle 118 may also have a trigger 122 that may be slidably attached to the inner face of the handle 118 and the underside of the barrel portion 114. The trigger 122 may be located such that a user may depress it with his index finger when the sprayer 100 is operated. Underneath the trigger, as shown in one exemplary embodiment, a on-off switch 124 may be located on the handle 118. The location and orientation of the trigger 122 and on-off switch 124 may be changed as needed or desired.

The barrel portion 114 of the applicator 110 may generally join the front portion 112 to the rear portion 116. Secured on top of the barrel portion 114 may be an extendable wand 126. The extendable wand 126 may be secured above the barrel portion 114 by a receiving clip that is located towards the front portion 112 of the applicator 110. The extendable wand 126 may be connected to a flexible tube 130 at its proximal end and connected to a nozzle 128 at its distal end. The operation of the extendable wand 126 and the internals of the barrel portion 114 will be described in greater detail below.

The front portion 112 of the sprayer 100 generally extends downwardly and rearwardly from the barrel portion 114, at approximately a 45° angle. The front portion 112 may have a generally curved shape along it outer face, almost having a cone-like shape. The cone-like shape may be configured such that the front portion 112 can be combined to and receive the cartridge 150. Moreover, the front portion 112 may house a pump mechanism (not shown).

In one embodiment, the front portion 112 may have one or more ergonomic gripping pads 132. The one or more ergonomic pads 132 may be formed or molded along the outer, curved surface of the front portion 112. The one or more gripping pads 132 may be oppositely disposed along on the outer surface of the front portion 112. The one or more gripping pads 132 may provide another gripping point for a user's non-trigger hand. That is, when a user grips the handle 118 he may also reach around the sprayer 100 with his opposite hand to grasp the front portion 112 of the sprayer 100 for additional support, control, and stability. In one embodiment, the gripping pads 132 may be generally triangular and sized to accommodate an average adult's hand. The size, shape, and number of the gripping pads 132, however, may be changed as needed or desired.

FIGS. 4A-C illustrate exemplary embodiments of the cartridge 150 for the sprayer (not shown). Referring to, and as seen in, FIGS. 4A-C, the cartridge 150 may be generally cylindrical in shape. This cylindrical shape may facilitate its insertion into the applicator (not shown). The cartridge 150 may have a cylindrical neck 152 (shown in FIGS. 4B and C) with a screw thread 154 (shown in FIG. 4C) on its outer surface. An annular ring 156 may be formed along the perimeter of the neck 152 and may be located underneath the screw thread 154. This annular ring 156 may provide support for a cap that may be threaded onto the cartridge 150.

FIG. 4A shows an exemplary embodiment of an overlay cap 158 secured to the cartridge 150. Generally, the overlay cap 158 may be a wide-mouthed cap that can fit onto the cartridge 150. The overlay cap 158 may have one or more ergonomic gripping recesses 160 spaced about its circumference. That is, the ergonomic gripping recess 160 may be formed or molded or indented along the outer periphery of the cap 158. The gripping recess 160 may be shaped to accommodate the natural orientation of a user's grip. The ergonomic gripping recess 160 may include one or more separate finger recesses.

In one embodiment, the gripping recess 160 includes multiple single finger recesses that may be substantially semicircular in shape in shape. The gripping recesses 160 may have a width and depth to accommodate an average adult finger. In one embodiment, the one or more gripping recesses 160 may be equally spaced along the outer surface of the cap 158. The gripping recesses 160 may be generally centered in the vertical direction with respect to the top of the cap 158 and the point where the cap 158 may contact a shoulder region 164 of the cartridge 150. Inside of the overlay cap 158 may be a standard bottle cap, which is described below, in order to removable secure the cap 158 to the cartridge 150.

FIG. 4B shows a standard bottle cap 162 secured to the cartridge 150. The standard bottle cap 162 may have receiving grooves on its inside surface so that it can be threaded and secured onto the cylindrical neck 152 of the cartridge 150 to seal the contents. The cartridge 150 may be optionally be fitted with a peelable seal in the form of a thin, flat disk that has a slightly larger diameter than the mouth of the cartridge 150.

As previously mentioned, the cartridge 150 may be substantially cylindrical. The cartridge 150 may have a shoulder region 164 formed by two transition zones that join the cylindrical neck 152 to its cylindrical body. The shoulder region 164 may have a first transition zone defined by a convex curve located at the base of the cylindrical neck 152. The convex curve merges into a concave curve, which may form the upper portion of the cartridge 150. The radius of the concave curve is often larger than that of the convex curve. Overall, the cartridge 150 defines a hollow compartment to store RTU liquid products, such as herbicides, insecticides, and fungicides. A typical cartridge 150 may contain 1 to 2 liters of liquid product but may hold any amount. As an optional feature, the cartridge 150 may have a plurality of ergonomic recesses or raised grips spaced around its outer circumference at or near the bottom to enable a customer to firmly grasp the cartridge when inserting it into or removing it from the applicator. The cartridge 150 may further be translucent in order to monitor the RTU liquid levels.

FIG. 4C illustrates the cartridge 150 fitted with a closure assembly 200, which fits into the mouth of the cartridge 150. The closure assembly 200 may be designed to seal the contents of the cartridge 150. The closure assembly 200 may further provide the fitment assembly by which RTU liquid may flow from the cartridge 150 to the applicator 110 when the cartridge 150 is attached thereto.

FIGS. 5A-D illustrate exemplary embodiments of the closure assembly 200 that is adapted to reliably establish liquid and shut off liquid flow from the cartridge 150. Generally, the closure assembly 200 may be designed and constructed to prevent liquid product from leaking or escaping when the cartridge 150 is connected and disconnected from the applicator (not shown). The closure assembly 200 and its components, described below, may be made of any suitable material. The closure assembly 150 may be constructed from multiple components, modular components, or be one whole, integral piece.

Figure 5A:
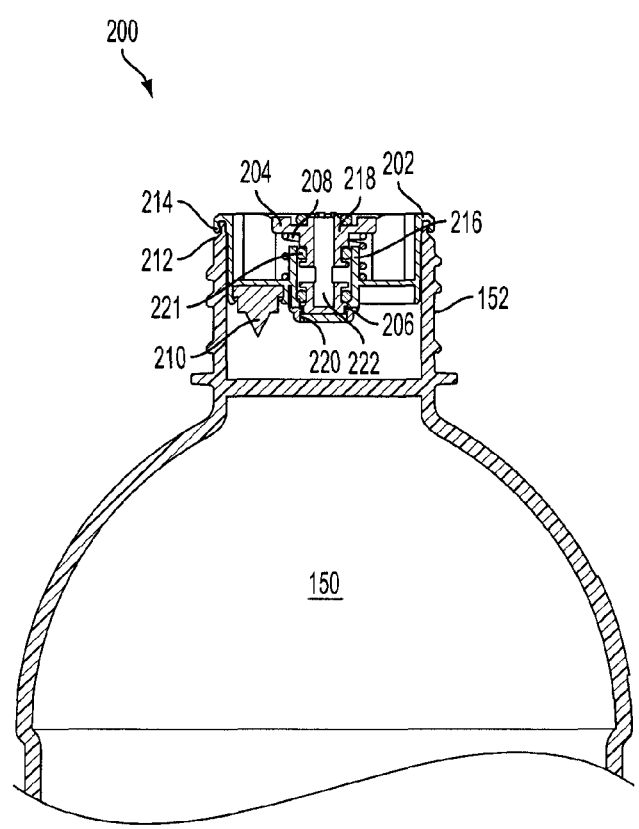
FIG. 5A is a cross-sectional view of a closure assembly in a closed position, in accordance with an exemplary embodiment.

Generally, the closure assembly 200 may have five components, a collar member 202, a plunger valve 204, a plunger cap 206, a resilient element 208, and a vent 210. FIG. 5A shows the closure assembly in a closed position—i.e., the plunger valve 204 is biased in an upward direction—without a cap attached to the cartridge 150.

Referring to FIG. 5A, the closure assembly 200 may fit onto the mouth of the cartridge 150. To secure the closure assembly 200 to the mouth of the cartridge, the cartridge 150 may have a receiving groove 212 along the perimeter of its outer face, at or near the mouth of the cartridge 150. The receiving groove 212 may allow for the collar member 200, which has a corresponding projection 214, to be snap- or friction-fitted over and into the open mouth of the cartridge 150. The collar member 200 may be constructed such that a standard bottle cap or an overlay cap (with reference back to FIGS. 4A and B) may still be threaded and secured onto the cylindrical neck 152, over the mouth, to seal the contents of the cartridge 150. Generally, the collar member 202 may be a single piece, that is generally circular. The collar member 202 may have a concentric well 216 therein configured to receive the plunger valve 204. The collar member 202 may further be configured to house or contain the vent 210.

The closure assembly 200 may further comprises the plunger valve 204, which may be adapted to be fitted inside of and slidably supported by the well 216 in the collar member 202. The plunger valve 204 may generally be said to have an upper portion 218 and a lower portion 220. The upper portion 218 may be mechanically coupled together with the lower portion 220. The upper portion 218 may have a substantially flat head and a substantially cylindrical shaft. Within the plunger valve 204 there may be a fluid passageway 222, the fluid passageway 22 generally having an inverted t-shaped cross-section with three open ends, two ends of which that permit RTU liquid to flow from the cartridge 150 to the applicator (not shown) when the plunger valve 204 is in an open position.

Three sealing elements 224 may be disposed within defined grooves in the plunger valve 204. A first sealing element may be secured in the top face of the plunger valve's 204 substantially flat head. This first sealing element may provide a seal against the applicator (not shown) when the cartridge 150 is attached thereto. A second sealing element may be seated between the outer face of plunger valve 204 in its upper portion 218, and the inner face of the collar member 202, more specifically, the inner face of the well 216. This sealing element may create a seal between the outer face of the plunger valve 204 and inner face of the well 216 to prevent liquid from escaping between the interface when the closure assembly 200 is in the open position. A third sealing element may be seated in the lower portion 220 of the plunger valve 204, also against the inner face of the well 216. This sealing element may be the primary means by which liquid flow is precluded when the plunger valve 204 is in the closed position. Each sealing element may be an O-ring made or rubber or silicone, but other sealing elements, materials, or configurations may be used.

The lower portion 220 of the plunger valve 204 may have a terminal end configured to mate with the plunger cap 206. Generally, the plunger cap 206 may have a geometry that is complementary to the lower portion 220 of the plunger valve 204. At or near the terminal end of the plunge valve 204 may be an annular ring (not shown) formed on the outer face of the plunger valve 204 so that the plunger cap 206, with a corresponding receiving groove, may be snap- or friction-fitted onto the plunger valve 204. The plunger cap 206 may act as another sealing element in the closed position, where it contacts part of the collar member 202.

As mentioned above, the plunger valve 204 may be slidably mounted inside of the collar member 202. To achieve this, a resilient element 208, such as a spring, maybe provided about the plunger valve's 204 substantially cylindrical shaft. The resilient element 208 generally serves to bias the plunger valve 204 upwardly in a closed position and allows the plunger valve 204 to be slidably opened when it is compressed. The resilient element 208 may be securely held in place between the underneath side of the plunger valve's 204 flat head and the collar member 202. The resilient member 208 may also be disposed about the outside face of the well 216. When the cartridge 150 is not attached to the applicator (not shown) the plunger valve 204 may be biased in a closed position such that the second and third sealing element, and the plunger cap 206 may contact various parts of the collar member 202, thereby sealing the liquid passageway so that no RTU liquid can escape the cartridge 150.

Figure 5B:
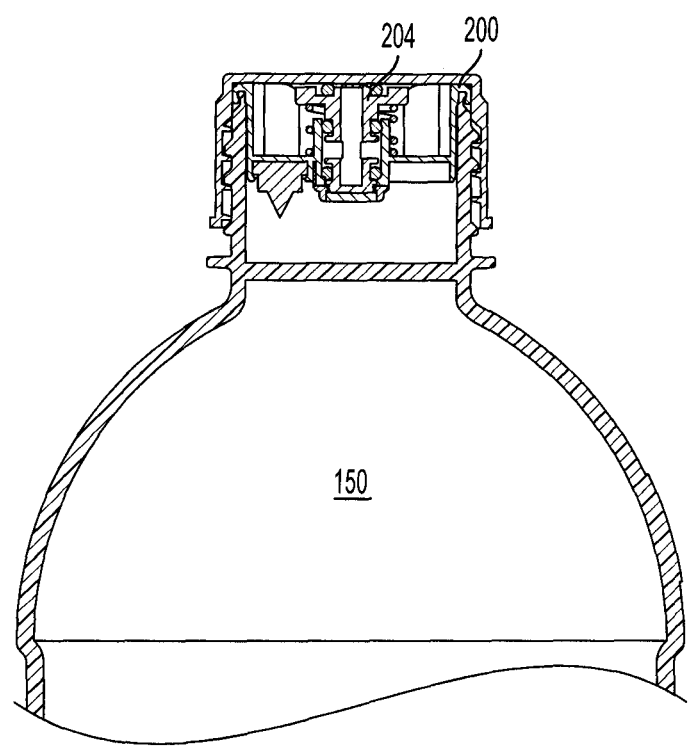
FIG. 5B is a cross-sectional view of a closure assembly in a closed position with a standard bottle cap attached, in accordance with an exemplary embodiment.
Figure 5C:
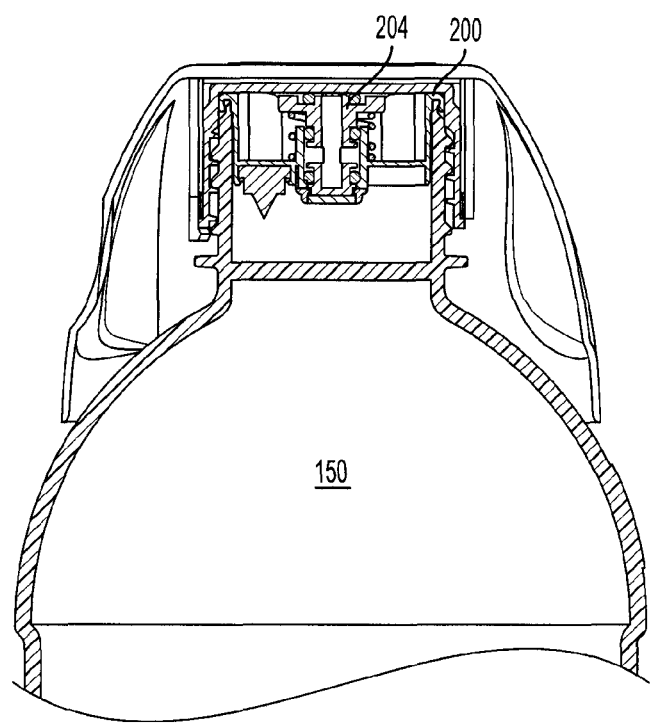
FIG. 5C is a cross-sectional view of a closure assembly in a closed position with an overlay bottle cap attached, in accordance with an exemplary embodiment.

FIGS. 5B and C illustrate an exemplary embodiment of the closure assembly 200 where a cap may be secured onto the cartridge 150. As shown, the closure assembly 200 does not interfere with securing a cap to the cartridge 150. Moreover, the plunger valve 204 is not urged into an open position when a cap is attached to the cartridge 150.

Figure 5D:
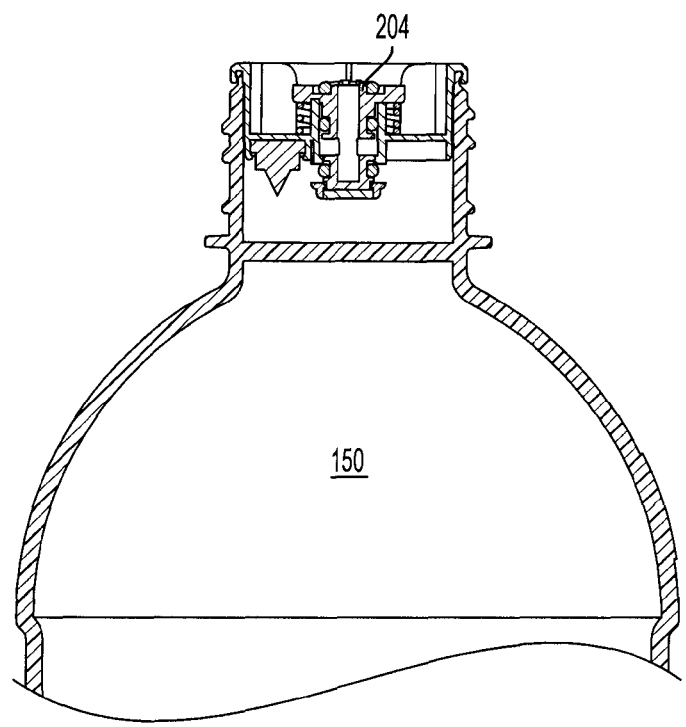
FIG. 5D is a cross-sectional view of a closure assembly in an open position, in accordance with an exemplary embodiment.

FIG. 5D illustrates an exemplary embodiment of the closure assembly 200 where the plunger valve 204 is in an open position. Though not shown, the plunger valve 204 is only urged into an open position when the cartridge 150 is attached to the applicator 110, which will be further described below. In one exemplary embodiment, the plunger valve 204 may be urged downwardly to permit RTU liquid to flow from the cartridge 150 through the fluid passageway 222 in the plunger valve 204. When in an open position, the resilient element 208 is compressed, which forces the plunger valve 204 to slide down into the well 216. When this occurs, the two ends of the t-shaped fluid passage way 222 move into the cartridge 150. In other words, the plunger valve 204 is urged downward such that the third sealing element and plunger cap 206 no longer make contact with the collar member 202.

Figure 6:
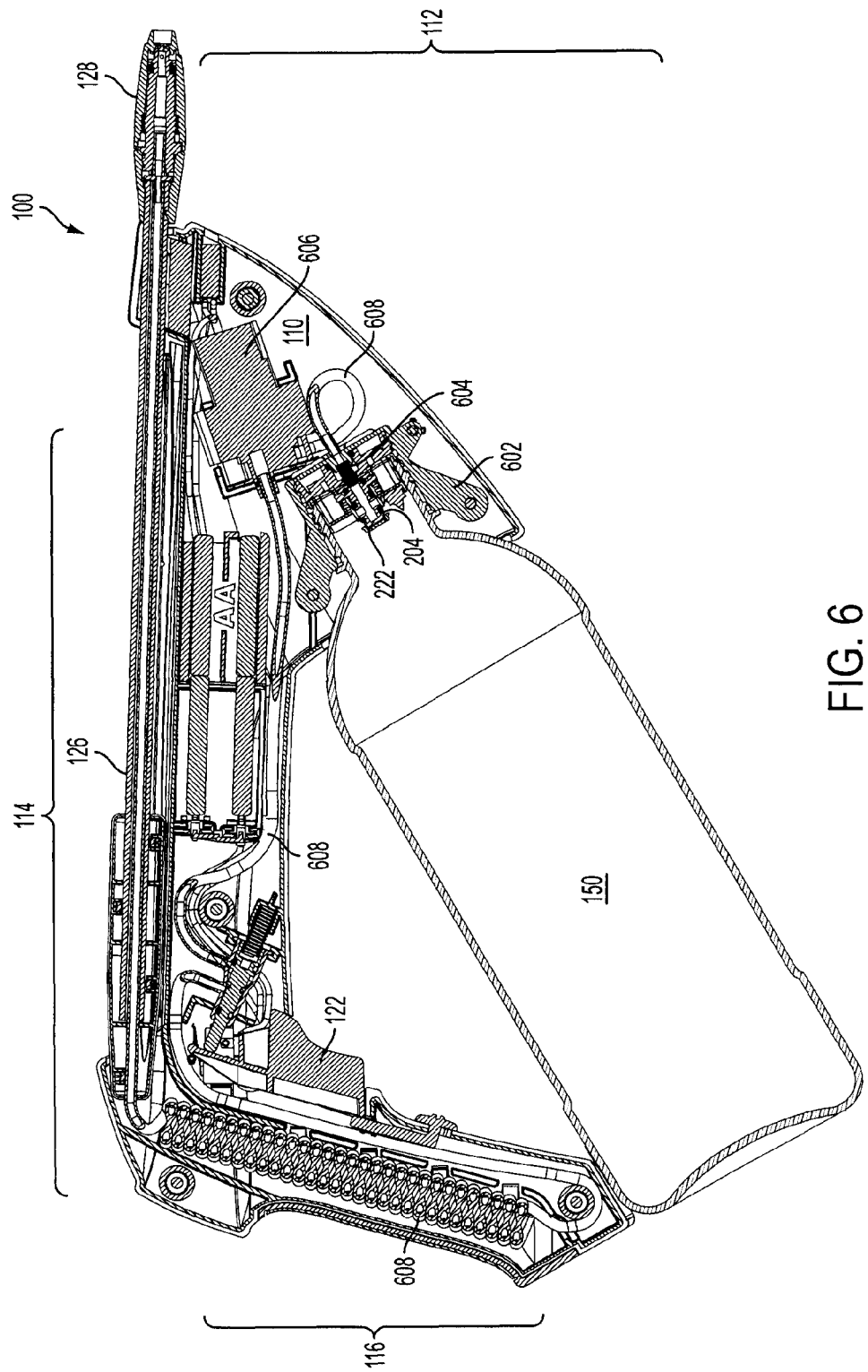
FIG. 6 is a cross-sectional view of a sprayer, in accordance with an exemplary embodiment.

FIG. 6 illustrates an exemplary embodiment of the sprayer 100 with the cartridge 150 attached to the applicator 110. As can be seen, there is a internal receiving port 602 inside of the front portion 112 of the applicator 110 configured to receive the cartridge 150. The cartridge 150 may be connected to the applicator 110 in a screwing manner. When connected, the head of the plunger valve 204 may be engaged with a corresponding part of the applicator 110. The first sealing element may therefore create a radial seal between the plunger valve 204 and the applicator 110. As the cartridge may be securely connected to the applicator 110, such an engagement compresses the resilient element, causing the plunger valve 204 to slide downward through the collar member to an open position, as described above. A ball valve 604 ensures that the passageway 222 of the plunger valve 204 remains sealed until a pump 606 is activated.

FIG. 6 further illustrates a cross-section of the applicator 110 and the cartridge 150. The internals of the applicator 110 may be designed and configured to create path of fluid flow for the RTU liquid, beginning from the cartridge 150, through a pump 606, through a flexible or rigid tube, and eventually out of the nozzle 128. The pump may be of any type. In one embodiment, the sprayer 100 may have a electrically-powered pump to dispense RTU liquid. Suitable pumps include centrifugal, vane, lobe, diaphragm, positive displacement, or rotary gear pumps. While there are many different types of pumps for pumping or inducing fluid from the cartridge 150 through the applicator 110, a rotary gear pump may be effective due to its stable, non-pulsing motion, which ensures static flow during operation. As shown in FIG. 6, the sprayer 100 may have a rotary gear pump 606, which may be electrically coupled and driven by a DC electric motor. The motor, in turn, may be battery-powered. The power supply may be a rechargeable battery, one-time disposable battery (or batteries), or battery pack. It is contemplated that the power supply will be of sufficient voltage to adequately supply power to the internal electrical components of the pump 606.

The gear pump may be located in a generally sealed compartment located within the front portion 112 of the applicator 110. The generally sealed compartment which houses the gear pump may have an inlet tube and an outlet tube connected thereto. In other words, the inlet tube may at its proximal end be adjacent to the fluid passageway 222 of the plunger valve 204, and at its terminal end by adjacent to the suction port of the pump. The pump 606 may be activated by the trigger 122, which, upon engagement, activates a microswitch (not shown) that is connected to the motor. As is commonly understood in the art, a gear pump uses the meshing of gears to pump RTU liquid form the cartridge 150 by displacement. The gear pump may use external gear pumps or internal gear pumps. Once activated, the RTU liquid may enter the suction port of the pump after it flows through the inlet tube. The RTU liquid may then be drawn between the rotor (large exterior gear) and idler (small interior gear) teeth, for example and discharged through the outlet tube that is connected to the generally sealed compartment. It should be understood, as previously mentioned, that the sprayer 100 is not limited to any particular type of pump mechanism.

In operation, depressing trigger 122 causes the pump to force the ball valve 604, which may be connected by a spring, away from its seat on the fluid passageway 222 of the plunger valve 204. This results in pressurized RTU liquid to flow through the sprayer 100. The stream of RTU liquid will continue as long as the trigger 122 is depressed and the ball valve 604 is off of its seat. Release of the trigger 122 immediately forces the ball valve 604 to reseat, thereby preventing RTU liquid from flowing. Such ball valve assemblies are well known in the art. It should be understood that the ball valve may be replaced with any type of valve arrangement.

After the RTU liquid enters the pump 606, it is sent through the flexible tube 608, which extends from the front portion 112 of the applicator, through the barrel portion 114, through the rear portion 116, through the extendable wand 126, eventually terminating in the nozzle 128.

When the RTU liquid product is dispensed—i.e., when the pump is activated by the trigger 122—from the applicator 110, it travels through the flexible tube 608, which extends throughout the applicator 110. The flexible tube 608 may have a portion that is contractible and helically coiled inside of the handle 118. The tube 608, at its distal end, connects to the extendable wand 126. The extendable wand 126 may be fitted with a three-way adjustable spray nozzle 128, for example. The spray nozzle 128 may regulate the spray flow, droplet size, and spray pattern of the RTU liquid as it is discharged from the sprayer 100. The nozzle 128 may be adapted discharge the RTU liquid in a spray pattern ranging from a stream jet pattern to a full-cone pattern, to maximize coverage for dispensing liquid product.

In another exemplary embodiment, a second cartridge (not shown) may be provided or used with the sprayer (not shown) in addition to the cartridge 150. The second cartridge, which may be filled with water or any other suitable substance, may be used to flush or purge residual RTU product from within the sprayer following use of the sprayer with cartridge 150 containing the RTU product. For example, the sprayer, with the second cartridge attached, may be discharged by a user for about 10 seconds, or any other suitable amount of time, to eliminate effectively all residual RTU product remaining in the sprayer following use of the sprayer with cartridge 150 containing the RTU product. The second cartridge may be designed similar to the cartridge 150 and have a similar closure assembly. Alternatively, the second cartridge may be of any suitable size and shape and have any suitable closure assembly, to allow a user to purge the sprayer following use of the sprayer with cartridge 150 containing the RTU product. The second cartridge containing water or any other substance suitable to purge the sprayer may be advantageously used to prevent cross-contamination when the sprayer is used with a cartridge 150 containing a first RTU product, for example an herbicide, and then is subsequently used with another cartridge 150 containing a second RTU product, for example a fertilizer.

Figure 7A:
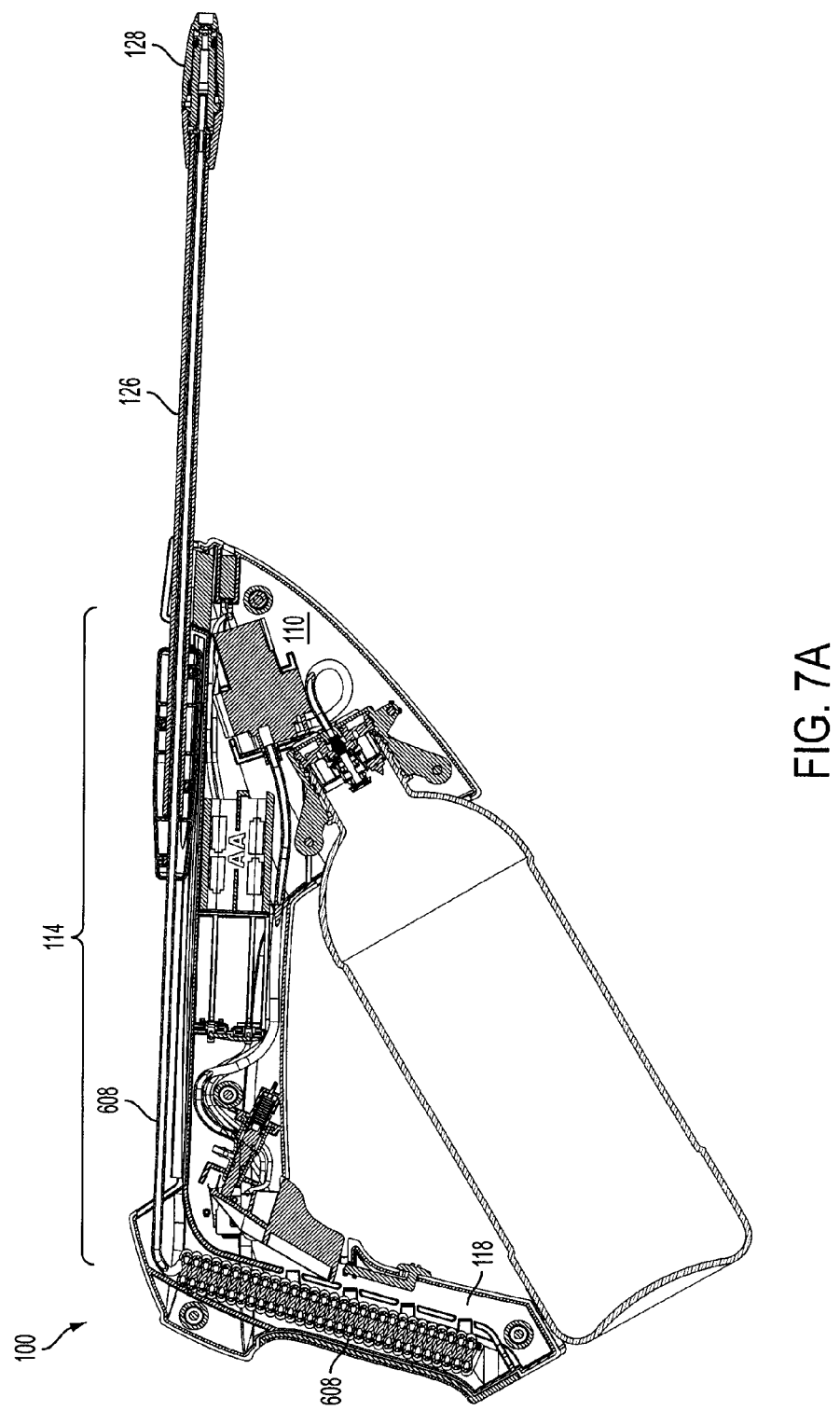
FIG. 7A is a cross-sectional view of a sprayer with an extendable wand, in accordance with an exemplary embodiment.

FIGS. 7A and B illustrate an exemplary embodiment of the sprayer 100 with the extendable wand 126 extended and/or detached from the applicator 110. The extendable wand 126 may be removably connected to the barrel portion 114 of the sprayer 100. A user can thus remove the extendable wand 126 to dispense the RTU liquid in otherwise inaccessible places. As seen in FIGS. 7A and 7B, the extendable wand 126 may be retractable using the flexible tube 608, which may be helically coiled inside of the handle 118. The extendable wand 126 may have a elongated shaft that can be easily manipulated by a user. At the terminating end of the extendable wand 126 may be the nozzle 128. The nozzle 128 may be rotatable to allow a user to control the spray pattern of the RTU liquid as it is discharged from the sprayer 100 from a stream to a cone pattern. Such nozzles are well known in the art.

Figure 8:
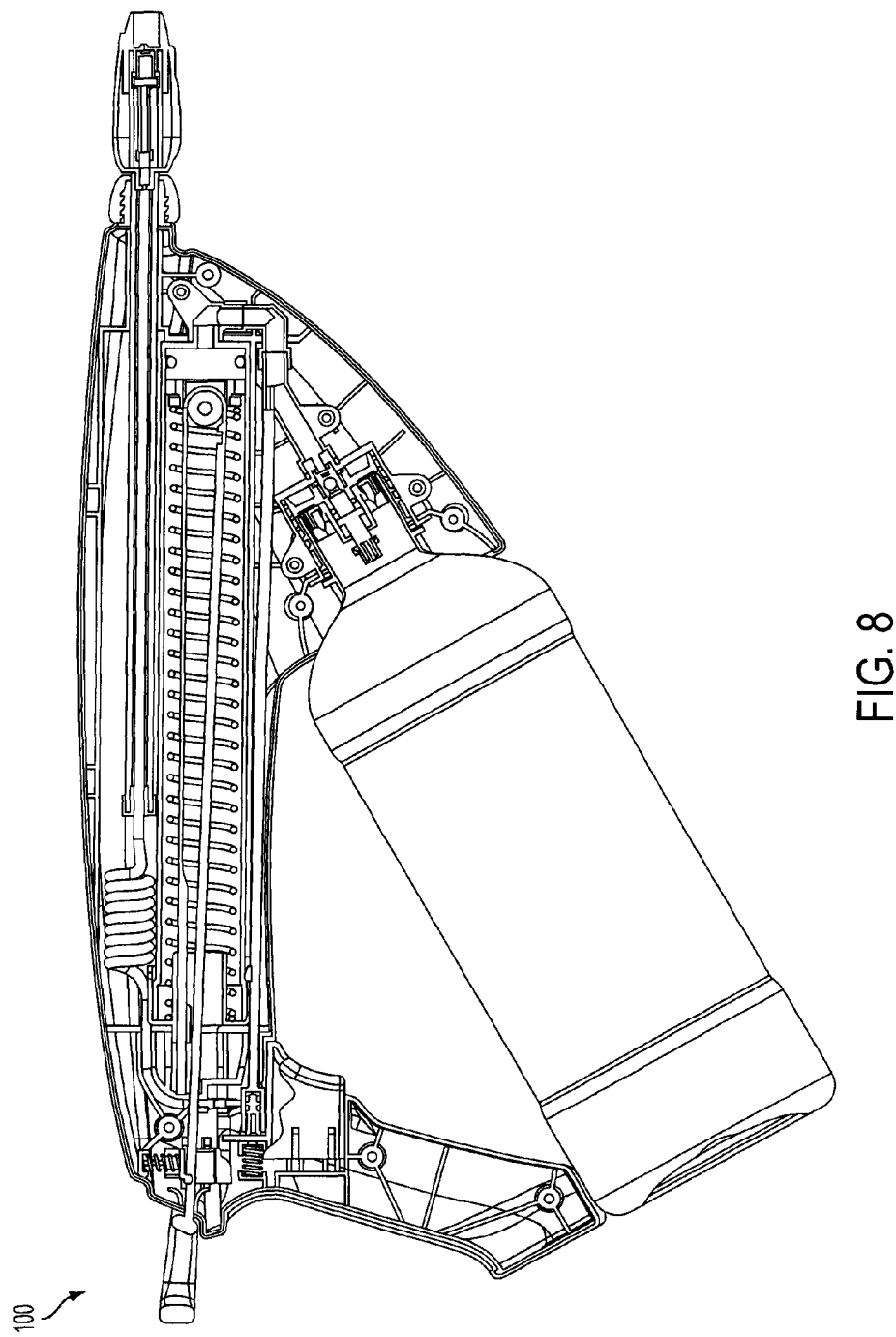
FIG. 8 is a cross-sectional view of a sprayer with a manual pump, in accordance with an exemplary embodiment.

As mentioned above, the sprayer 100 may include a manually-operated pump in lieu of an electrically driven pump. FIG. 8 shows an exemplary embodiment of a spraying having a manually-operated pump for discharging RTU-liquid from the sprayer 100.

In the preceding specification, various preferred exemplary embodiments have been described with reference to the accompanying drawings. It will, however, be evident that various modifications and changes may be made thereto, and additional exemplary embodiments may be implemented, without departing from the broader scope of the embodiments as set forth in the claims that follow. The specification and drawings are accordingly to be regarded in an illustrative rather than restrictive sense.

What is claimed is:

1. A sprayer comprising:
    a cartridge defining an interior compartment for containing a liquid product comprising a top end and a bottom end;
    an applicator having a support body, comprising a front portion, a barrel portion, and a rear portion, an extendable wand removably attached to the barrel portion, a handle at the rear portion, and an electronically driven pump contained within the front portion, wherein the barrel portion joins the front portion and the rear portion; and
    wherein the cartridge is removably attached to the applicator such that the cartridge extends from the front portion to the rear portion of the support body and a portion of the cartridge proximate to the bottom end is adjacent to an inside portion of the handle such that the inside portion of the handle provides support to hold the cartridge in place, and wherein further the cartridge and handle form a support base to allow the sprayer to reside in an upright position.

2. The sprayer of claim 1, wherein the front portion has one or more ergonomic gripping pads formed along the outer surface.

3. The sprayer of claim 1, wherein the cartridge comprises a closure assembly removably connected to the cartridge.

4. The sprayer of claim 3, wherein the closure assembly seals the interior compartment of the cartridge.

5. The sprayer of claim 3, wherein the closure assembly comprises a valve slidably coupled to the closure assembly.

6. The sprayer of claim 5, wherein the support body comprises a port, comprising a port valve, configured to receive the cartridge and the slidably coupled valve moves from a closed position to an open position when the cartridge is connected to the applicator.

7. A sprayer comprising:
    a cartridge defining an interior compartment for containing a liquid product and comprising a top end and a bottom end;

an applicator having a support body, comprising a front portion, a barrel portion, and a rear portion, an extendable wand removably attached to the barrel portion, a handle at the rear portion, and a manually driven pump wherein the barrel portion loins the front portion and the rear portion; and wherein the cartridge is removably attached to the applicator such that the cartridge extends from the front portion to the rear portion of the support body and a portion of the cartridge proximate to the bottom end is adjacent to an inside portion of the handle such that the inside portion of the handle provides support to hold the cartridge in place, and wherein further the cartridge and handle form a support base to allow the sprayer to reside in an upright position.

8. The sprayer of claim 7, wherein the cartridge comprises a closure assembly removably connected to the cartridge.

9. The sprayer of claim 8, wherein the closure assembly seals the interior compartment of the cartridge.

10. The sprayer of claim 8, wherein the closure assembly comprises a valve slidably coupled to the closure assembly.

11. The sprayer of claim 7, wherein the support body comprises a port, comprising a ball valve, configured to receive the cartridge.

* * * * *